United States Patent
Smarr et al.

(10) Patent No.: US 6,805,240 B2
(45) Date of Patent: Oct. 19, 2004

(54) END CAP SUPPORT FOR JUMBO ROLLS OF MATERIAL

(75) Inventors: Eric Smarr, Columbia, SC (US); Melvyn J. Leeb, Owings Mills, MD (US)

(73) Assignee: Melvin J. Leeb, Owings Mills, MD (US)

( * ) Notice: Subject to any disclaimer, the term of this patent is extended or adjusted under 35 U.S.C. 154(b) by 177 days.

(21) Appl. No.: 10/228,121

(22) Filed: Aug. 26, 2002

(65) Prior Publication Data

US 2003/0230506 A1 Dec. 18, 2003

Related U.S. Application Data

(63) Continuation-in-part of application No. 10/173,951, filed on Jun. 17, 2002.

(51) Int. Cl.[7] ............................................... B65D 85/66
(52) U.S. Cl. ...................................... 206/416; 206/397
(58) Field of Search .................................. 206/389, 397, 206/407, 409, 410, 413–416, 497; 242/170, 171, 588.6, 598

(56) References Cited

U.S. PATENT DOCUMENTS

| | | | | |
|---|---|---|---|---|
| 2,864,493 A | * | 12/1958 | Holcombe | 242/588.6 |
| 3,332,546 A | * | 7/1967 | Frank | 206/395 |
| 3,837,480 A | * | 9/1974 | Brunett | 206/497 |
| 4,027,794 A | * | 6/1977 | Olson | 206/395 |
| 4,151,914 A | * | 5/1979 | Blatt | 206/386 |
| 4,444,313 A | * | 4/1984 | Tyson | 206/397 |
| 5,533,620 A | * | 7/1996 | Torterolo | 206/397 |
| 5,704,479 A | * | 1/1998 | Barnett et al. | 206/395 |

* cited by examiner

*Primary Examiner*—Luan K. Bui
(74) *Attorney, Agent, or Firm*—Armstrong, Kratz, Quintos, Hanson & Brooks, LLP

(57) ABSTRACT

An end cap support for the protruding end of a jumbo roll of paper or other materials (weighing between 2,000 and 4,000 pounds) includes at least one corrugated paper panel bonded to at least one lightweight rigid panel, preferably comprising luaun wood that resists moisture absorption. A very substantial weight reduction is obtained consonant with excellent stacking strength for the end cap support. The luaun panel does not fold over or warp, and all of the materials are biodegradable and hence environmentally friendly.

5 Claims, 6 Drawing Sheets

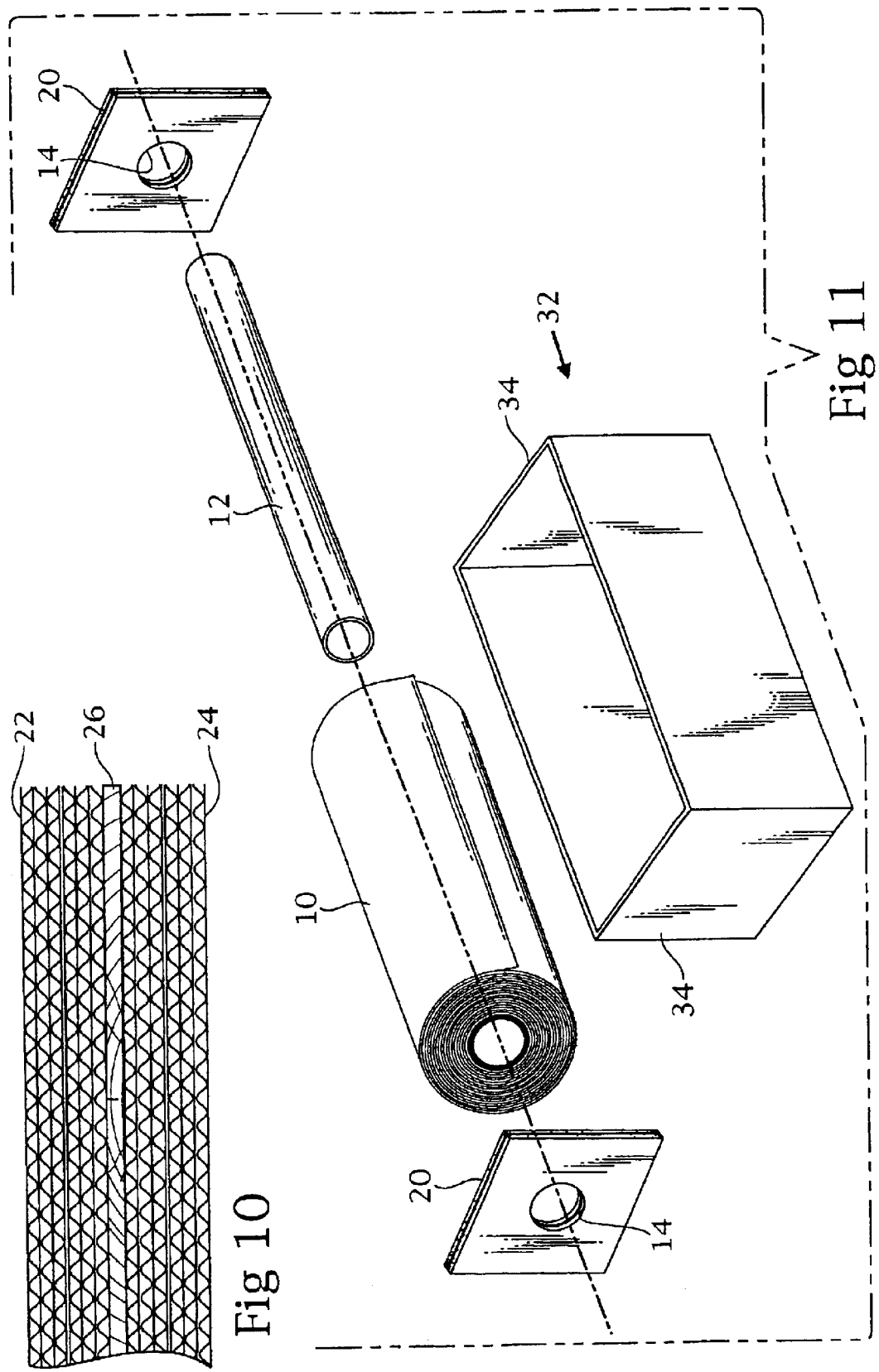

END CAP SUPPORT FOR JUMBO ROLLS OF MATERIAL

CROSS-REFERENCE TO RELATED APPLICATION

This application is a continuation-in-part of application Ser. No. 10/173,951 field Jun. 17, 2002, the contents and disclosure of which are hereby incorporated by reference herein in their entirety.

BACKGROUND OF THE INVENTION

1. Field of the Invention

The present invention relates to very large rolls of material wound on a core and, more particularly, to end cap supports for the rolls of material in storage or shipping.

2. Description of Related Art

Continuous rolls of material such as tape, paper, plastic film, fabrics and the like are stored and shipped on central cores or spools around which the material is wound. These rolls may be several feet long and may weigh at least 2,000 pounds ("jumbo rolls"). The core protrudes beyond the outer ends of the material, and the protruding core is supported by end caps within a carton, crate, shrink wrap or suitable frame.

At the present time, an end cap is formed from an expanded (foam) polystyrene panel which is glued to a wooden sheet. There are several problems with these commercially-available end caps. The glue sometimes fails so that the foam separates from the wood. The core then rests on the foam which, by itself, is incapable of supporting the weight. The roll then rests on the shipping carton or crate and is difficult to remove. Sometimes, the heavy roll shifts during transport and may damage the shipping vehicle or may damage the material on the roll. The polystyrene is not biodegradable and disposal introduces environmental problems. Further, the wooden sheet must be the same size as the polyethylene panel for maximum strength and preparation of the end cap is relatively costly since there is waste in cutting the wooden sheet to the required size. Thus, for economy, the wooden sheet is often smaller than the polystyrene panel and maximum support is not provided.

Additionally, the end caps heretofore used in the prior art are relatively heavy, thus increasing shipping costs particularly with overseas shipments.

Another problem encountered in the prior art is warpage of the wooden (or pressed plywood) boards that tend to absorb moisture.

Thus, there is a need for a lightweight, biodegradable and sturdy end cap assembly, one which does not warp nor fail because of moisture absorption and consequent gluing deficiencies.

BRIEF SUMMARY OF THE INVENTION

Accordingly, it is the primary object of the present invention to provide an end cap support (or assembly) for jumbo rolls of material, which alleviates the disadvantages and deficiencies of the prior art.

It is another object of the present invention to provide an end cap support which is lightweight, biodegradable, resistant to moisture absorption, and utilizes its materials to maximum advantage.

The present invention finds particular utility for use in a jumbo roll of material, wherein the jumbo roll is on a central spool having respective ends protruding beyond the jumbo roll, and wherein an end cap support is provided for each protruding end of the spool, each end cap support having an opening for receiving the respective protruding end of the spool. Within this environment, the present invention comprises an improvement, wherein the end cap support includes at least one corrugated paper panel bonded to at least one lightweight rigid panel.

In one embodiment of the present invention, the corrugated paper panel includes a pair of corrugated paper panels bonded on opposite sides of the one lightweight rigid panel.

In another embodiment, the corrugated paper panel includes a central corrugated paper panel, and the lightweight rigid panel comprises a pair of lightweight rigid panels bonded on opposite sides of the central corrugated paper panel. The central corrugated paper panel may include at least one pair of corrugated paper sheets; alternatively, two pairs of corrugated paper sheets are provided.

Preferably, the pair of lightweight rigid panels includes a pair of luaun panels that resist moisture absorption In the preferred embodiment, the corrugated paper panel includes substantially-tubular channels oriented vertically in use of the end cap support, thereby substantially assisting in accommodating compressive loads especially encountered when the jumbo rolls of material are stacked vertically.

In accordance with the teachings of the present invention, the end cap support is lightweight and biodegradable and comprises a central corrugated paper panel including at least one pair of corrugated paper sheets. A pair of lightweight rigid panels is bonded to the central corrugated paper panel on opposite sides thereof and each of the panels comprises a luaun panel that resists moisture absorption. The corrugated paper panel has substantially-tubular channels oriented vertically in use of the end cap support, thereby substantially assisting in accommodating compressive loads especially encountered when the jumbo rolls of material are stacked vertically.

In accordance with the further teachings of the present invention, the end cap support includes at least one luaun panel and a pair of corrugated paper panels bonded to the central lightweight rigid panel on opposite sides thereof.

These and other objects of the present invention will become apparent from a reading of the following specification taken in conjunction with the enclosed drawings.

BRIEF DESCRIPTION OF THE DRAWINGS

FIG. 10 is a cross-sectional view taken across the lines 10—10 of FIG. 9.

FIG. 11 is an exploded view of the system of the present invention.

DESCRIPTION OF THE PREFERRED EMBODIMENTS

Figure 1:
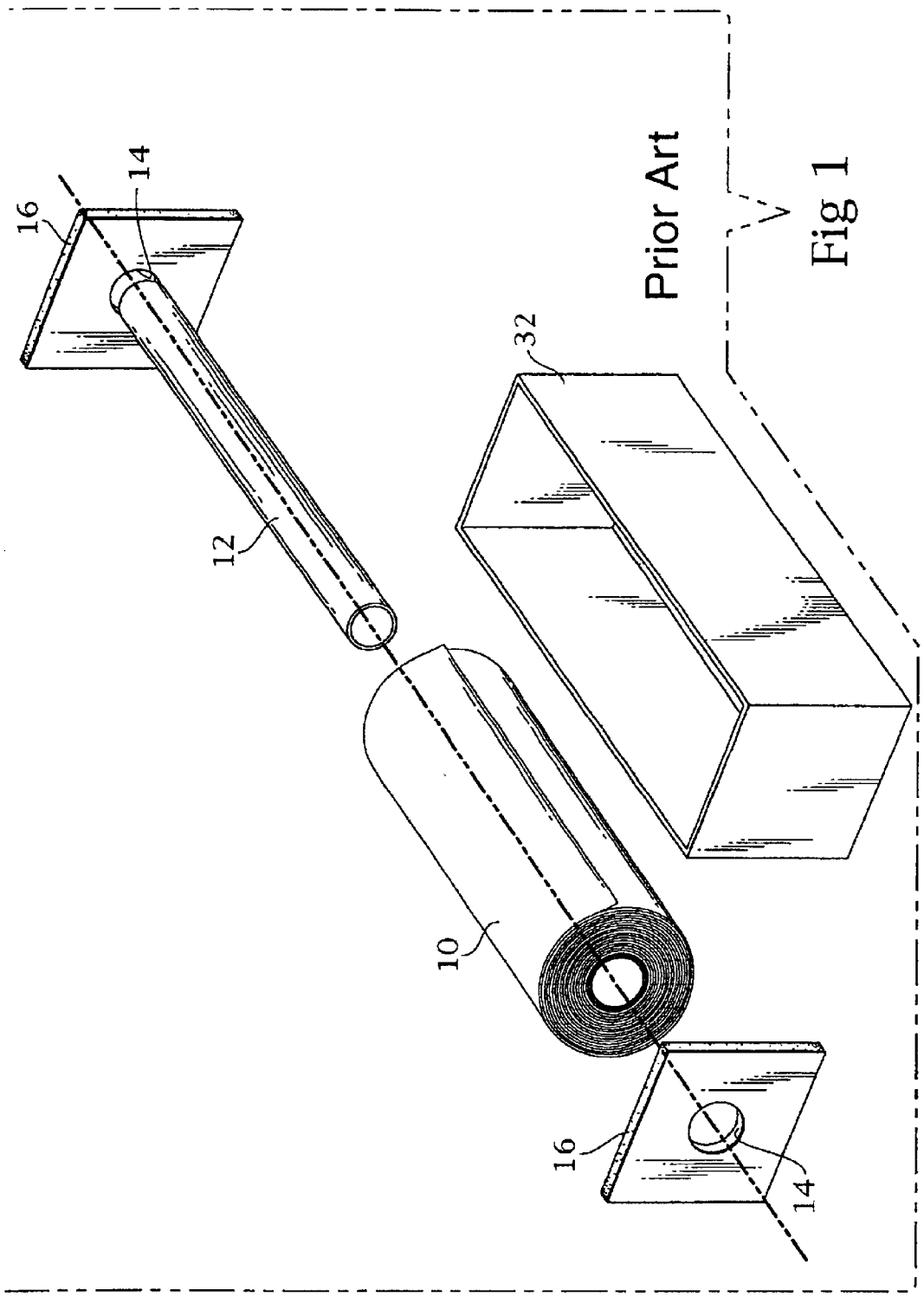
FIG. 1 is an exploded view of the prior art.
Figure 2:
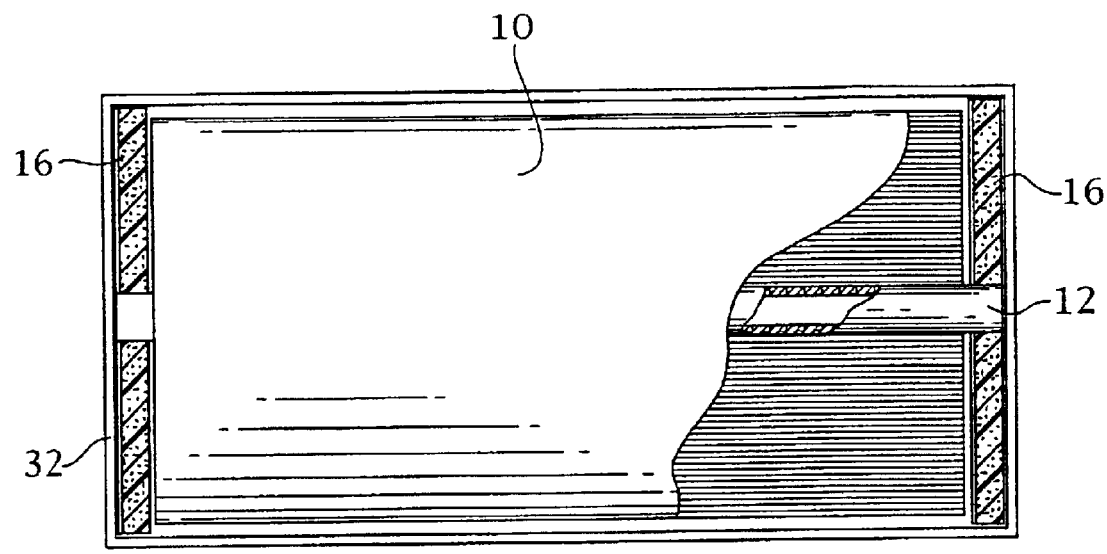
FIG. 2 is a partial cross-sectional view of the prior art.
Figure 3:
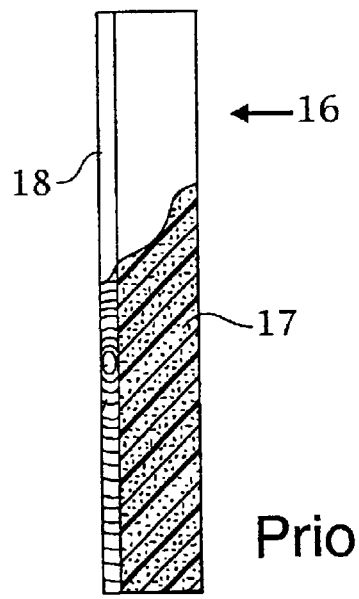
FIG. 3 is a cross-sectional view of an end cap support of the prior art.

As shown in FIGS. 1–3, the prior art has a roll of material 10 wrapped around a spool (or core) 12. The ends of the spool which protrude outwardly from the roll of material are received in an opening 14 in each of the end cap supports 16. The end cap supports 16 are formed from polystyrene foam 17 which is glued to a wooden panel 18. The wooden panel 18 generally has a smaller area than the area of the polystyrene panel 17. The glue frequently fails and the wood separates from the polystyrene. The polystyrene by itself does not have the strength to support the weight of the roll of material and the polystyrene end cap support collapses.

Figure 4:
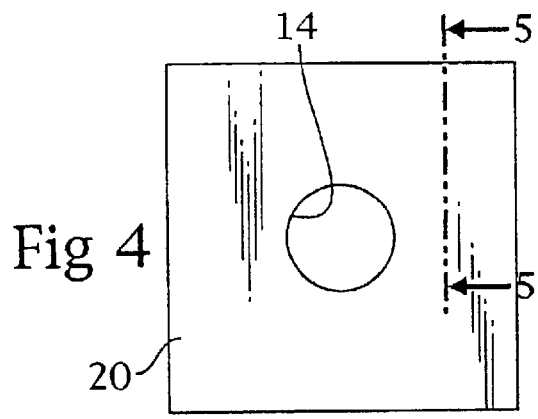
FIG. 4 is a front view of the end cap support of the present invention.
Figure 5:
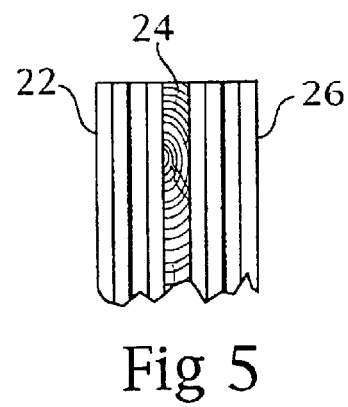
FIG. 5 is an enlarged cross-sectional view taken across the lines 5—5 of FIG. 4.
Figure 6:
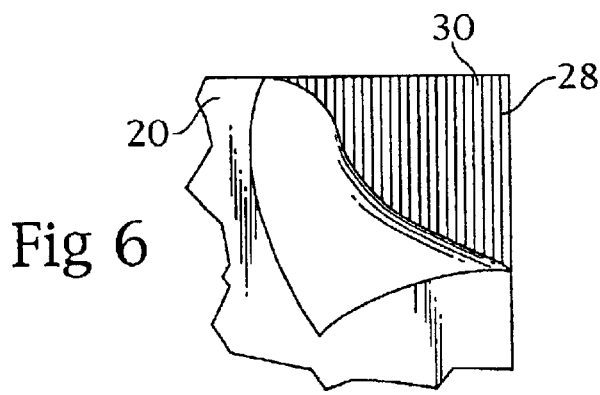
FIG. 6 is an enlarged view of a peeled back corner of FIG. 4.
Figure 7:
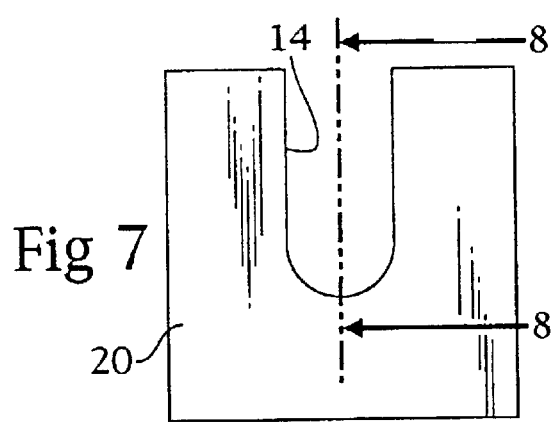
FIG. 7 is a front view of an alternate embodiment of the end cap support of the present invention.
Figure 8:
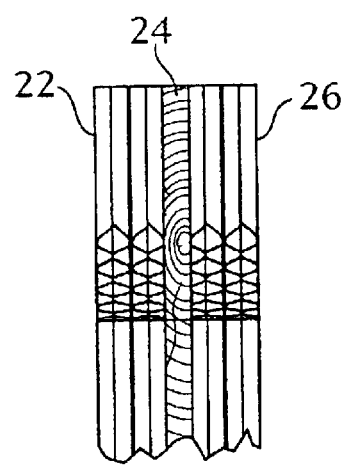
FIG. 8 is an enlarged cross-sectional view taken across the lines 8—8 of FIG. 7.
Figure 9:
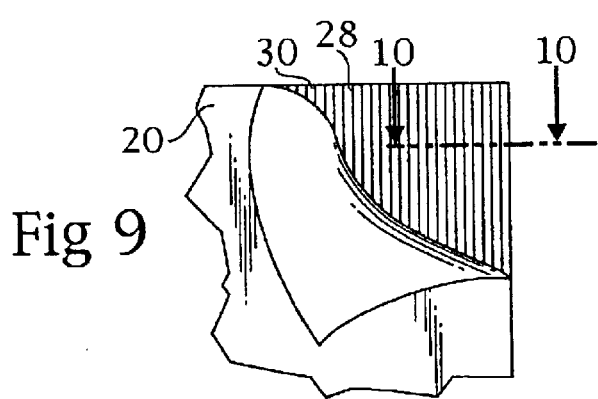
FIG. 9 is an enlarged view of a peeled back corner of FIG. 8.

The end cap support 20 of the present invention (FIGS. 4–6) is formed from a first portion 22 and a second portion 24, each being corrugated board. A center portion 26 is sandwiched between the first portion 22 and the second portion 24. The center portion is formed from a rigid material. The rigid material may be wood, preferably a heavier plywood, paper board, fiber board, compressed newspaper, plastic or other materials known to persons skilled in the art. The plywood may be laminated sheets or may be pressed board. The center portion 26 is glued to both the first portion 22 and the second portion 24. The first portion 22 and the second portion 24 preferably are at least two layers laminated and glued together. The first portion 22 and the second portion 24 may be formed by folding a single sheet of corrugated board in half and gluing the two halves together. The corrugated board has a plurality of alternating ribs 28 and channels 30 between outer layers of heavy paper. The corrugated board in each of the first portion 22 and the second portion 24 of each end cap support 20 are oriented in a vertical manner such that the ribs and channels extend between the top and the bottom of each end cap support 20. The first portion 22, the second portion 24 and the center portion 26 are identical in dimensions with respect to height and width. The thickness of the first portion 22, the second portion 24 and the center portion 26 are not critical and may vary depending upon the weight of the roll of material 10. Usually, the center portion 26 has a thickness of approximately ¼" and the first and second portion each have a thickness of approximately ⅞". However, these thicknesses may vary and are not limiting. The height for the end cap support 20 is greater than the combined diameter of the core 12 and the roll of material 10 wound around the core 12.

Each end cap support 20 has an opening 14 formed therein. Preferably, the opening is circular and is in approximately the center of the end cap support although the opening may be in another location. The opening 14 preferably is a through opening extending through the first, second and center portions. Typically, the opening has a diameter of about 6½" but is not so limited. However, the opening does not necessarily extend through all three portions but may be through the first portion, the center portion and partially through the third portion. In this manner, the protruding end of the core 12 is received in the opening 14 and is supported by at least the first portion and the center portion. Maximum support for the core 12 is provided with a through opening 14 so that the protruding end of the core extends completely through the end cap support 20.

In an alternate embodiment (FIGS. 7–10) the opening 14 is a U-shaped channel extending from the top of each end cap support 20 toward the center of the respective end cap support 20. This embodiment permits easier installation of the protruding end of the core 12 into the opening 14. Also, since the U-shaped opening is formed from the top of the end cap support 20, the vertical orientation of the corrugation is assured to provide maximum strength to the end cap support 20. There is no possibility of having the end cap support 20 disposed on its side with respect to the core.

Figure 12:
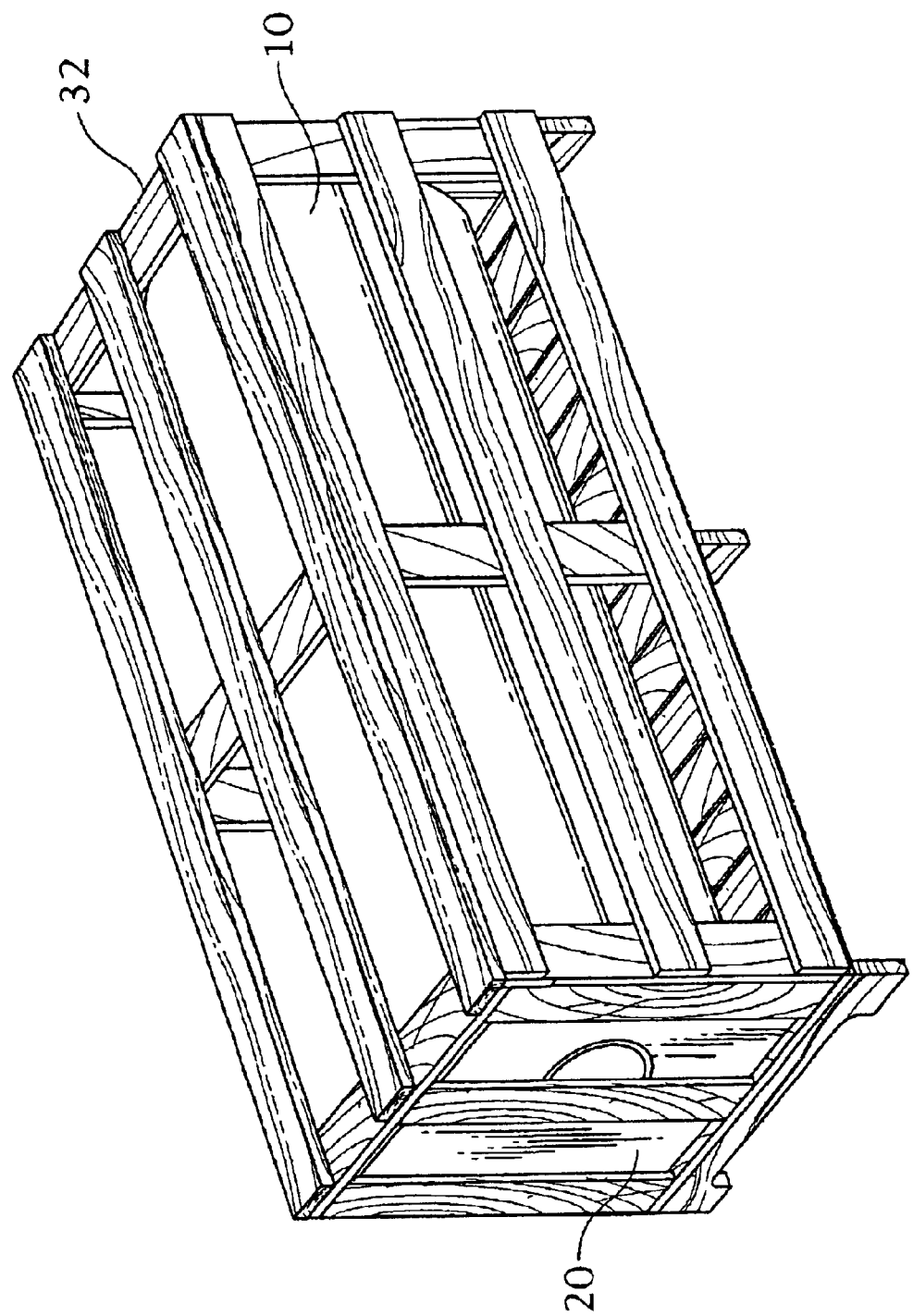
FIG. 12 is a perspective view of the crate of the present invention.

FIGS. 11 and 12 show a storage and shipping container for a jumbo roll of material 10 wound about a core 12. Inside an outer crate, carton or shrink wrapped cover 32, the end cap supports 20 are disposed adjacent to the opposite end walls 34 of the container 32. The ends of the core 12 which protrude beyond the roll of material 10 are received in the respective openings 14 on the end cap supports 20. The container 32 is closed and may be stored or shipped with the contents secure therein. The container may be formed from corrugated board, wood, shrink wrapper or other materials known to persons skilled in the art. The container may have a bottom portion formed as a pallet to facilitate moving the container by use of a forklift vehicle.

The use of corrugated board, paper board, fiber board, compressed newspaper, plastic or wood in the end cap supports 16 provides biodegradable materials which meet environmental needs. The polystyrene foam of the prior art is not biodegradable. The core 12 may be formed from spiral wound paper, board, plastic or other material known to persons skilled in the art. Also, the end core supports 16 of the present invention are more economical to produce than the end core supports which are presently used.

Figure 13:
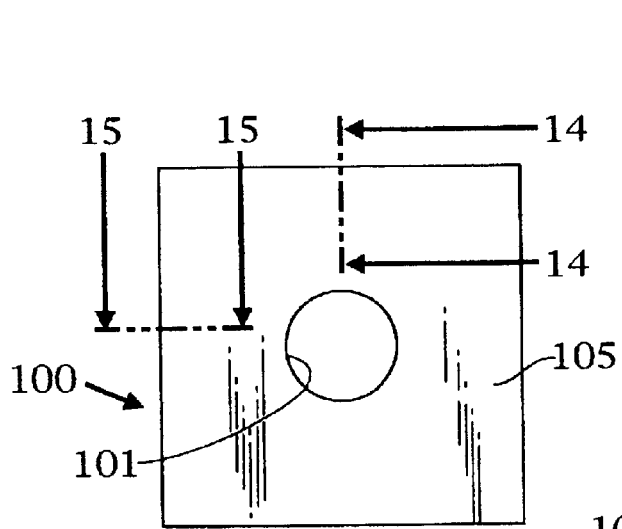
FIG. 13 is an alternate embodiment of the present invention.
Figure 14:
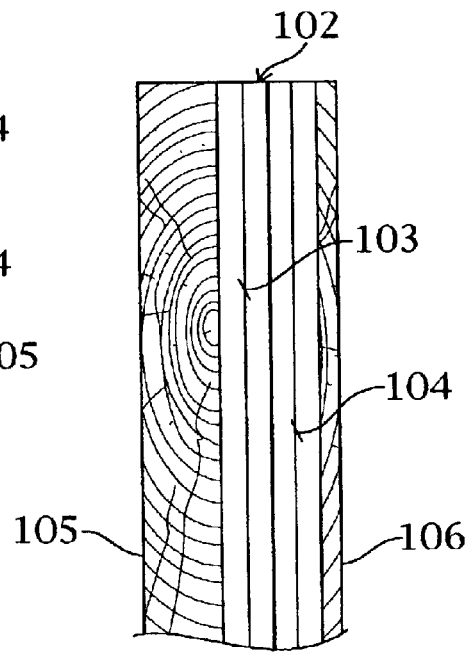
FIG. 14 is a cross-section thereof, taken along the lines 14—14 of FIG. 13 and enlarged in scale.
Figure 15:
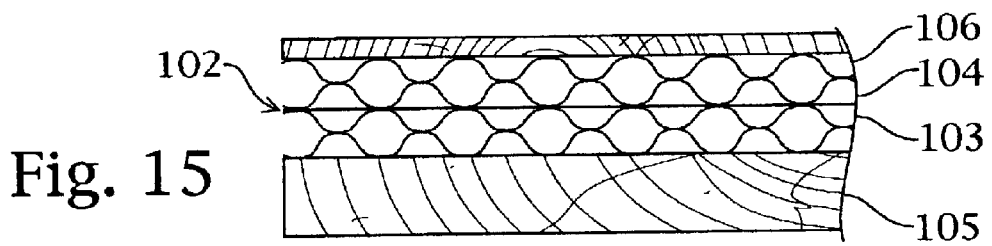
FIG. 15 is a further cross-section thereof, taken along the lines 15—15 of FIG. 13 and enlarged in scale.
Figure 16:
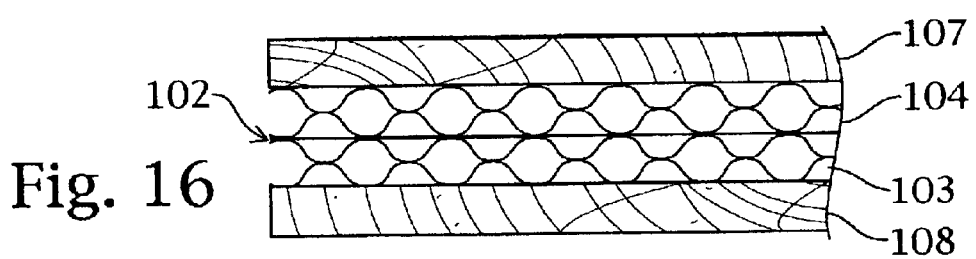
FIG. 16 is a first modification of the embodiment of the invention shown in FIG. 15.

With reference to FIGS. 13–15, an end cap support 100 has a central opening 101 for receiving the respective end of the spool of the jumbo roll. As shown, the central opening 101 is circular; however, it will be understood that a U-shaped or other opening is feasible consonant with the teachings of the present invention.

With this in mind, the end cap support 100 includes a central corrugated paper panel 102 formed from corrugated paper sheets 103 and 104, respectively. A pair of lightweight rigid panels comprising an inner lightweight rigid panel 105 and an outer lightweight rigid panel 106 are bonded by a suitable adhesive to opposite sides of the central corrugated paper panel 102.

As shown, the inner lightweight rigid panel 105 is thicker than the outer lightweight rigid panel 106. However, and with reference to FIG. 15, the panels 107 and 108 may be of equal thickness if desired.

More significantly, the lightweight rigid panels 105–108, respectively, are preferably formed from luaun wood which is readily available from the Philippines or Indonesia. Luaun wood is strong, lightweight, economical and resists moisture absorption.

Figure 17:
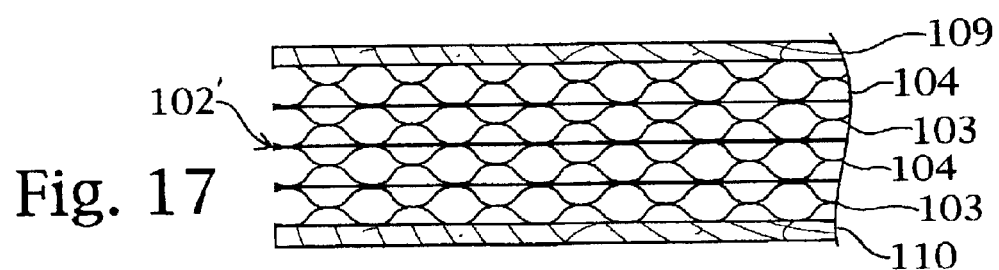
FIG. 17 is a second modification of the embodiment of the invention shown in FIG. 15.

With respect to FIG. 17, the central corrugated paper panel 102' includes a pair of panels, each of which includes corrugated paper sheets 103 and 104, respectively.

In one example of the present invention, the end cap supports are 32×42 inches and 1 inch thick, and each rigid luaun panel is 3.6 mm thick. Of special significance, the end cap supports weigh approximately 12 pounds compared to the prior art commercially-available end cap supports which weigh approximately 40 pounds. This is a 70% reduction in weight which translates into a substantial savings in shipping costs, especially overseas. The materials are used for their best features, and the fluting or channels of the corrugated paper panels contribute to an excellent stacking strength for the jumbo rolls which weigh between 2,000 and 4,000 pounds. Moreover, the rigid panels don't warp (being resistant to moisture absorption) nor fold in on itself; and all of the materials are biodegradable, hence environmental friendly.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. In a jumbo roll of material, wherein the jumbo roll is on a central spool having respective ends protruding beyond the jumbo roll, and wherein an end cap support is provided for each protruding end of the spool, each end cap support having an opening for receiving the respective protruding end of the spool, the improvement wherein the end cap support comprises at least one corrugated paper panel bonded to at least one lightweight rigid panel, wherein said at least one corrugated paper panel comprises a central corrugated paper panel, wherein said at least one lightweight rigid panel comprises a pair of lightweight rigid panels bonded on opposite sides of the central corrugated paper panel, and wherein said pair of lightweight rigid panels comprises a pair of luaun panels that resist moisture absorption.

2. The improvement of claim 1, wherein each of the luaun panels is of equal thickness.

3. The improvement of claim 1, wherein the luaun panels are of different thickness and comprise an inner luaun panel which is thicker than an outer luaun panel.

4. In a jumbo roll of material, wherein the jumbo roll is on a central spool having respective ends protruding beyond the jumbo roll, and wherein an end cap support is provided for each protruding end of the spool, each end cap support having an opening for receiving the respective protruding end of the spool, the improvement wherein the end cap support is lightweight and biodegradable and comprises a central corrugated paper panel including at least one pair of corrugated paper sheets, a pair of lightweight rigid panels bonded to the central corrugated paper panel on opposite sides thereof, each of the panels comprising a luaun panel that resists moisture absorption, and the corrugated paper panel having substantially-tubular channels oriented vertically in use of the end cap support, thereby substantially assisting in accommodating compressive loads especially encountered when the jumbo rolls of material are stacked vertically.

5. In a jumbo roll of material wherein the jumbo roll is on a central spool having respective ends protruding beyond the jumbo roll, and wherein an end cap support is provided for each protruding end of the spool, each end cap support having an opening for receiving the respective protruding end of the spool, the improvement wherein the end cap support is lightweight and biodegradable and comprises a central lightweight rigid panel including at least one luaun panel that resists moisture absorption and a pair of corrugated paper panels bonded to the central lightweight rigid panel on opposite sides thereof, the corrugated paper panels having substantially-tubular channels oriented vertically in use of the end cap support, thereby substantially assisting in accommodating compressive loads especially encountered when the jumbo rolls of material are stacked vertically.

* * * * *